INVENTOR.
BILL G. WATTERS
BY

Sept. 19, 1961  B. G. WATTERS  3,000,464
ACOUSTIC ABSORBER
Filed Sept. 18, 1957  2 Sheets-Sheet 2

INVENTOR.
BILL G. WATTERS

United States Patent Office 3,000,464
Patented Sept. 19, 1961

3,000,464
ACOUSTIC ABSORBER
Bill G. Watters, Nahant, Mass., assignor to Bolt Beranek and Newman Inc., Cambridge, Mass., a corporation of Massachusetts
Filed Sept. 18, 1957, Ser. No. 684,676
12 Claims. (Cl. 181—33)

The present invention relates to acoustic absorbers and methods, and, more particularly, to materials suitable for absorbing acoustic energy accompanying the flow of a fluid medium, such as air through a confined space, such as a duct and the like.

For many years, the walls of ducts or other confined spaces have been lined with acoustically absorptive materials in order to absorb undesired acoustic vibrations in the medium bounded by the duct or space. The absorptive materials have been attached to the said walls directly or they have been disposed within perforated housings or baffles. In the case, for example, of air-conditioning ducts and the like, once the duct is assembled, the acoustically absorptive material may be inserted therein and attached with appropriate clips or brackets. This, of course, necessitates separate shipment and handling of the metal or similar ducts and of the acoustically absorptive material, and requires assembling steps. In addition, the bulk of the acoustically absorptive material itself renders it relatively expensive to ship and handle. Similar remarks apply to the shipment and assembly of materials used in other types of confined spaces requiring acoustic treatment.

An object of the present invention, however, is to provide a new and improved acoustic absorber that not only greatly reduces the before-described bulk in shipment, but that completely eliminates the costly assembling steps presently required to install acoustically absorptive layers.

A further object is to provide, if desired, a unitary duct wall—and absorber lining that may be prefabricated and shipped as a unit.

An additional object is to provide a new and improved method for attaining the above ends.

Other and further objects will be explained hereinafter and will be more particularly pointed out in the appended claims.

The invention will now be described in connection with the accompanying drawings FIG. 1 of which is a perspective view of a duct installation incorporating the invention in preferred form, in a collapsed condition;

In accordance with the present invention, a certain class of normally acoustically absorptive materials is employed which, when properly treated, can be greatly compressed and maintained in compressed condition for shipment and handling. During the compression process, however, the materials lose their acoustically absorptive properties. These properties are, however, subsequently restored at the installation end by techniques later discussed, which involve, generally, the re-expansion of the materials to their former dimensions and physical nature. While hardened or packed materials have heretofore been treated, for other purposes, with moisture or steam and the like, thereby to render them fluffy and soft, or impregnated materials have been treated to remove ingredients thereof, the present invention involves quite special and critically restrictive compression and expansion techniques and construction in order to solve the particular problem of rendering acoustically absorptive materials first non-absorptive and of reduced dimensions, and then acoustically absorptive once more and of substantially the original dimensions and physical properties of the materials.

Figure 1:
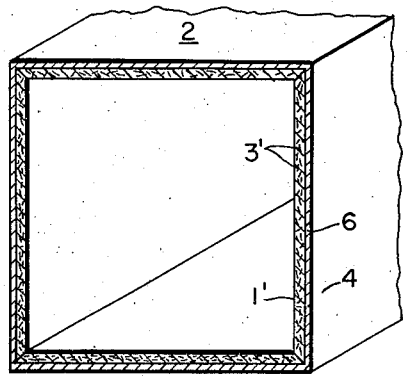
Figure 4:
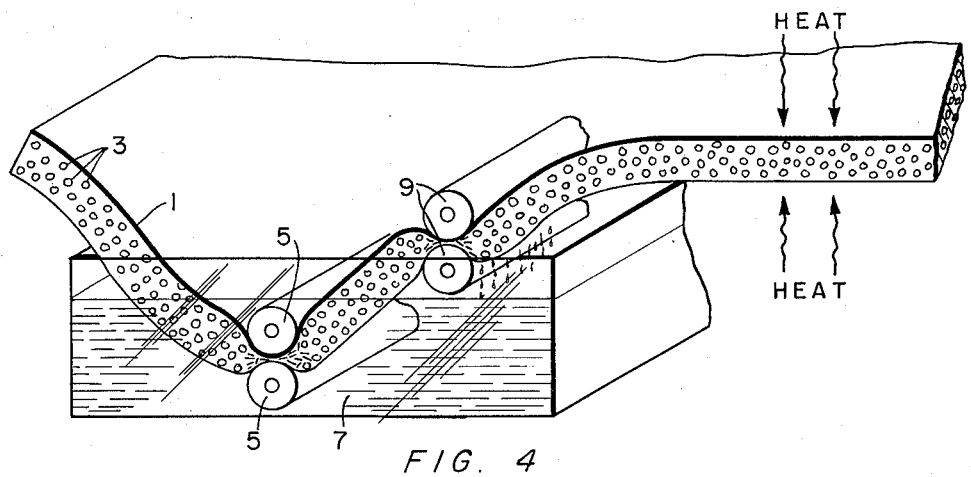
FIGS. 4 through 8 are fragmentary perspective views illustrating successive steps in the preferred fabrication method underlying the invention.

Thus, in FIG. 1, the invention is shown applied, for purposes of illustration, to an air-conditioning duct or conduit 2, as of sheet metal. It is to be understood, however, that the invention may also be used in a host of other applications, as before mentioned, where the features of the invention are desired. The inner surfaces of the walls 4 of the duct 2, are covered by a compressed material 1' that is shown as of little more bulk than the walls 4 themselves and that may be adhesively or otherwise secured to the same, as at 6. This compressed material 1' was normally, in its original uncompressed state, a fluffy, porous, foam-like material 1, FIG. 4, that had excellent acoustically absorptive properties. The pores or openings in the material have been schematically illustrated at 3 in FIG. 4, and it is to be understood that the term "foam-like," as used in the specification and claims, is intended to embrace all suitable foam-type plastic or spongey materials, porous fibrous mats and porous fluffy fiber layers and the like, later more fully discussed. In FIG. 1, however, the pores 3' are shown substantially completely collapsed and held in such collapsed condition by later-described means.

The duct 2 of FIG. 1 could thus be formed from a sheet metal carrier member 4 covered by a compressed formerly acoustically absorptive sheet material, member, layer or covering 1' that was shipped to the point of installation as a unit of little more bulk than the duct walls themselves. Alternatively, the thin sheet material, member or layer 1' could be separately shipped with far less bulk than conventional fluffy acoustically absorptive materials, and easily and quickly secured to the acoustically reflective duct walls 4 at the installation. It then remains to re-expand and restore the material 1' to its intial dimensions and its initial physical acoustically absorptive properties. The re-expansion of the compressed material 1' of FIG. 1 is illustrated at 1" in FIG. 2, the collapsed pores 3' of FIG. 1 being released as illustrated at 3" in FIG. 2, corresponding to the original pores 3 of the original material 1 of FIG. 4. As later explained, this re-expansion may be easily effected at the installation through appropriate simple treatment of the compressed layer 1' of FIG. 1.

Figure 3:
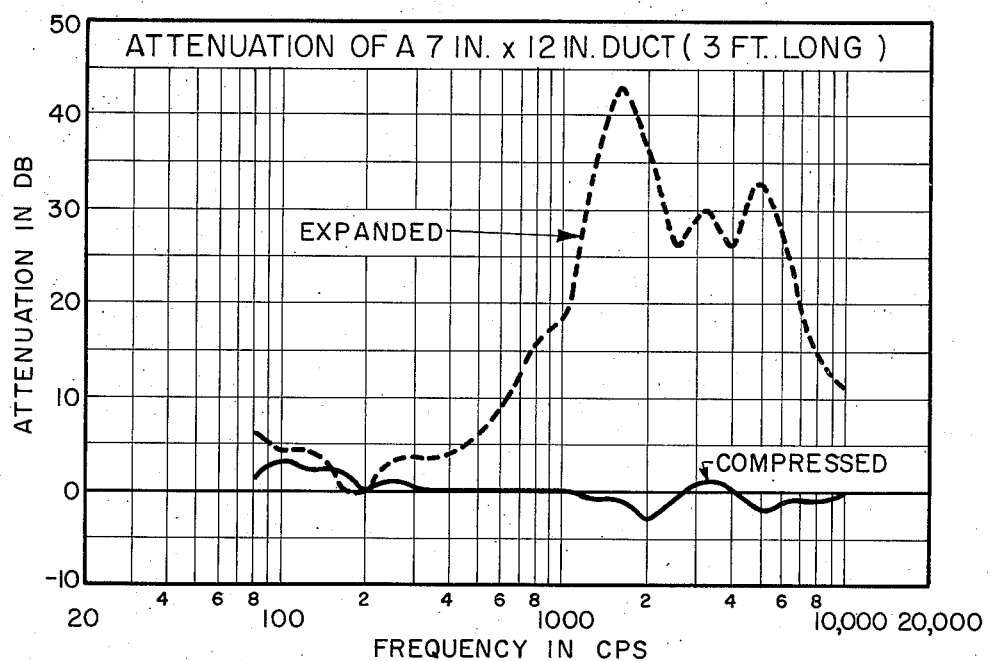
FIG. 3 is a graph descriptive of the acoustic performance of the installations of FIGS. 1 and 2.

In the case of a preferred polyurethane foam-like plastic layer or sheet 1, for example, originally about an inch thick, covering the walls of a seven by twelve-inch duct, three feet in length, the acoustic performance of FIG. 3 was obtained. FIG. 3 plots the experimentally obtained attenuation of the acoustic energy accompanying the flow of air within the duct, in units of decibels, along the ordinate, and the frequency of the acoustic vibrations in units of cycles per second, along the abscissa. In the transit-condition compressed form of FIG. 1, with the polyurethane layer 1' collapsed to a thickness of about four hundredths of an inch, the substantially non-absorptive characteristic of the solid-line curve of FIG. 3, labelled "Compressed," was obtained. When the layer 1', however, was re-expanded to substantially the original one-inch thickness, the acoustically absorptive characteristic of the dash-line curve "Expanded" of FIG. 3 was obtained, demonstrating attenuation of the order of five decibels in the low 100-cycle region; between twenty and forty-three decibels of attenuation in the intermediate frequency range of 1000 to 2000 cycles; and appreciable attenuation in the high-frequency region, with about twelve decibels at 10,000 cycles.

It is fortunate that, in addition to converting the compressed non-acoustically absorptive layer 1' into the effective acoustic absorbing layer 1", the expansion process also has been found to convert the layer 1' from a poor temperature insulator to an effective temperature insulator. This temperature insulation property may also, accordingly, be utilized, either together with the acoustic absorption property, as is useful in air-conditioning ducts and the like, or alone. With the above-mentioned compressed polyurethane layer 1' mounted upon a twenty guage metal carrier sheet 4, for example, an overall coefficient of heat transfer was determined to be 1.96 British thermal units per hour-foot-squared-degree Fahrenheit at a mean temperature of 92° Fahrenheit; whereas, in the expanded form 1" of FIG. 2, an effective temperature insulating heat transfer coefficient of only 0.340 British thermal units per hour-foot-squared-degree Fahrenheit was obtained.

Figure 5:
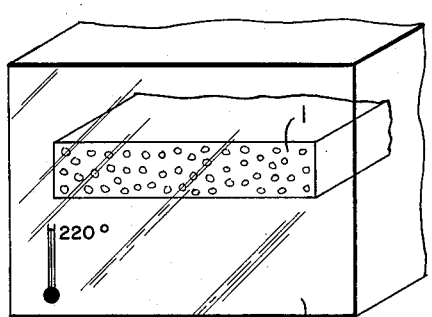
Figure 6:
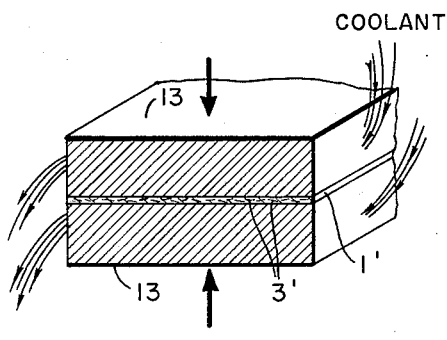

It now remains to describe the details of the compression and expansion techniques. Referring to the preferred polyurethane material 1, or the like, it is desirable to compress the same, as between rolls 5, FIG. 4, within an appropriate binder resin and the like in solution 7, such as "Piccopale," Number 100 organic resin (a product of Pennsylvania Industrial Chemical Corporation, Clairton, Pennsylvania) dissolved in toluene solvent. The thusly saturated material 1 may then be further compressed, as at 9, to squeeze out excess binder, after which the material may be at least partially dried, as through the application of heat. The walls of the pores 3 will thus be covered with a thin coating of the binder. The material 1 is then heated to a temperature of from about 200 to 220° Fahrenheit, as in an oven 11, FIG. 5, in order to soften the binder resin, and it is thereupon compressed at, for example, two hundred pounds/square inch pressure, in a press 13, FIG. 6, collapsing the pores 3 to the state 3'. The compressed material 1' is then cooled to room temperature as with the aid of coolant fluid passing through the press 13, during the continued compressing of the material. Typical periods of hot and cool compressions are about one and a half and two minutes, respectively, more or less. Such operations have been found to cause the binder layer on the walls of the pores reliably to hold the pores compressed, permanently, the resin becoming hard at room temperature. The polyurethane and the like may, however, serve as its own binder upon heat, compression and cooling, since it is a thermoplastic material, but additional resin is deemed preferable to serve as a release agent inside the compressed pores 3' for assisting the later-described release or expansion process.

Figure 2:
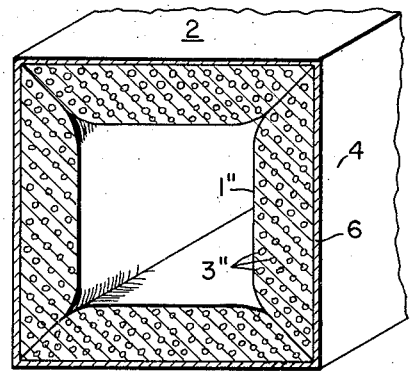
FIG. 2 is a similar view of the installation in an expanded condition.
Figure 7:
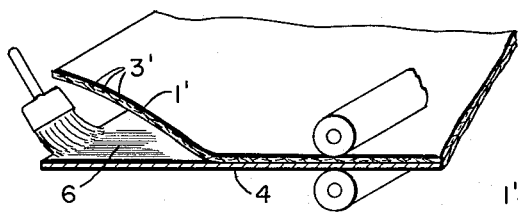
Figure 8:
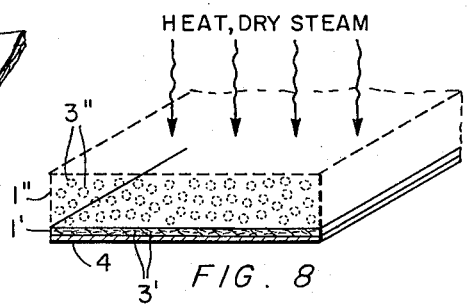

The compressed material 1' may then be secured to the carrier strip sheet or wall 4, hereinafter also generically referred to by the term "panel," with a suitable adhesive 6, FIG. 7, such as an epoxy-resin adhesive. The composite member 4—1', suitable for shipment and formation, as into the duct form 2 of FIG. 1, is thus provided, with the layer 1' of thickness comparable with that of the thin carrier sheet or wall 4 itself, and about a thirty percent increase in shipping weight over the carrier sheet or wall 4, alone. When the installation has been effected, the application of heat radiation, such as is provided by dry steam, melts the stiff or hard binder resin holding the pores 3' collapsed, thus permitting the pores to expand again as at 1", FIG. 2, and as shown in dotted lines in FIG. 8. Flexing of the expanded material 1" will fracture hardened bits of the resin and render the material 1" pliable as in its original state. As illustrated in FIG. 2, moreover, expansion even in the corners of the duct 2 can be satisfactorily obtained. By controlling the temperature of the heat and/or the time of its application, as well as the amount of binder resin itself, variations in the stiffness of the binder resin can be effected, correspondingly varying the degree of release of the compressed pores, and hence the extent of expansion of the material 1" and its effectiveness as an acoustic absorber. Control over the degree of thermal insulation provided by the material 1" is thus also achieved. The adhesive 6, such as the beforementioned epoxy-resin or the like, is relatively temperature independent so that the expansion step of FIG. 8 will not release the material 1" from the carrier 4.

The above-described resin binder is, of course, of the crystalline-resin type having a high elastic modulus at room or somewhat elevated temperatures, but melting abruptly (low modulus) at the highly elevated temperatures of dry steam or the like. The compressed material 1' will thus not be unintentionally expanded by the usual temperature variations encountered in storage or shipment. In addition to employing a binder that is releasable in response to heat radiation, binders sensitive to other types of radiation, including, for example, infrared, ultra-violet, radio or charged particle radiation, may also be employed, as may binders releasable upon the application of sufficient moisture, or releasable upon chemical reaction with a solvent. In some cases, the binder may add fire-proofing properties to the compressed material. As a further illustration, a compressed layer 1' of fire-resistant fibrous-glass porous material, herein termed "foam-like," has been compressed with a binder of acrylic plastic dissolved in toluene. Upon the application of ethylene di-chloride solvent, the binder was dissolved or otherwise chemically reacted to release the compressed pores 3' and permit expansion of the same, as at 3".

In general, compounds eminently suitable for this binder application include synthetic and natural resinous or waxy products which are hard and essentially nonplastic at or about room temperature, but which soften or liquefy in the temperature range of about 120° F. to 220° F. These compounds should be soluble to the extent of approximately 10% or more by weight in some relatively volatile solvent, such as naphtha, benzene, carbon tetrachloride, alcohol, water, etc., the appropriate solvent being determined by the properties of the acoustic material to be impregnated. Furthermore, these compounds should be reasonably stable chemically to the action of heat, and of atmospheric oxygen. Color, clarity, and physical strength of the compounds may be of little or no consequence in this application. Specific additional examples of materials suitable for this purpose are as follows:

Petroleum — derived solid hydrocarbon resins ("Piccopale")
Coumarone—indene resins
Rosin
Vinsol resin (Hercules Powder Co.)
Shellac
Asphalts of penetration grades 5–20
Solid novolak-type phenolic resins
Alkyd (glyceryl phthalate) resins
Maleic (glyceryl maleate) resins
Paraffin wax
Microcrystalline wax
Polyethylene wax
Thermoplastic methylcellulose
Polyamide resin (Versamid—General Mills)

If, as before stated, the release of the binder is to be effected by moisture, the material 1 can be saturated with a water-solution of a rapidly-water-soluble resin, compressed, and dried. On subsequent exposure to water vapor at elevated temperature (i.e., steam), or to hot, moist air, the resin will absorb water and redissolve, thus permitting the compressed form to re-expand. Resins suitable for this purpose include:

Sodium carboxymethylcellulose
Methyl cellulose
Polyvinyl alcohol
Hydroxyethylated polyvinyl alcohol
Soluble starch
Gum arabic
Dextrin
Polyvinyl pyrrolidone
Polyvinyl methyl ether-maleic anhydride
Sodium polyacrylate
Polyacrylamide In some instances, incorporation of a humectant (e.g., ethylene glycol, glycerine) with the resin may facilitate liquefaction on contact with humid air.

A porous sponge or fibrous mat, herein also termed "foam-like', can also be saturated with a water solution of a water-soluble resin and an enzyme which catalyzes deterioration of the resin, and then compressed and dried. On subsequent exposure to warm, moist conditions, the enzyme causes breakdown of the resin, permitting the compressed form to re-expand. Resin-enzyme systems suitable for this purpose include:

Proteinaceous gums, such as gelatin and casein, with proteolytic enzymes such as trypsin, ficin, papayin, pepsin, etc.

Polysaccharidic gums, such as gum arabic, kelgin, agar, starch, gum tragacanth, locust bean gum, guar gum, etc., with hydrolytic enzymes such as amylase, invertase, arabinase, etc.

Figure 9:
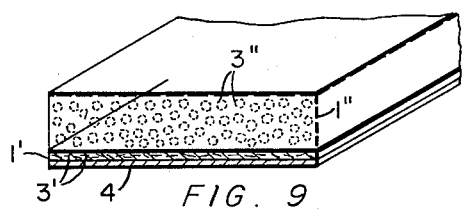
FIG. 9 is a similar view of a modification.

While the apparatus of FIG. 2 will absorb acoustic energy carried by the air passing within the duct 2, flexural-vibration damping may also be achieved by expanding only a layer or part 1" of the material, FIG. 9, leaving the rest of the material 1' adjacent the carrier 4 still in its relatively stiff compressed form.

Further modifications will occur to those skilled in the art and all such are considered to fall within the spirit and scope of the invention as defined in the appended claims.

What is claimed is:

1. A new article of manufacture, comprising an acoustically reflective panel having a compressed sheet secured thereto over substantially the entire area of the sheet, the sheet being formed of originally porous foam-like acoustically absorptive material the pores of which are substantially collapsed and provided with binding means associated with the pores for holding the pores so collapsed, the binding means being releasable to restore said material to its normal expanded physical characteristics.

2. The article of claim 1, said binding means being heat-releasable.

3. The article of claim 1, said binding means being moisture-releasable.

4. The article of claim 1, said binding means being chemically-releasable.

5. The article of claim 1, said binding means being releasable in varying degrees to control the physical characteristics of the said material.

6. The article of claim 1, said material also being temperature-insulative.

7. The article of claim 1, said sheet being secured to said panel by a temperature-independent adhesive.

8. The article of claim 1, said material being polyurethane.

9. The article of claim 1, said panel being metal.

10. The article of claim 1, said binding means being a resin which is hard and non-plastic at room temperature.

11. The article of claim 1, said binding means being a wax which is hard and non-plastic at room temperature.

12. A duct through which may flow a fluid medium carrying acoustic vibrations and having inner acoustically reflective walls lined with compressed originally porous foam-like acoustically absorptive material the pores of which are substantially collapsed and provided with binding means associated with the pores for holding the pores so collapsed, the binding means being releasable to restore said material to its normal expanded physical characteristics.

References Cited in the file of this patent

UNITED STATES PATENTS

| | | |
|---|---|---|
| 1,628,206 | Weiss | May 10, 1927 |
| 2,089,492 | Lambert | Aug. 10, 1937 |
| 2,142,164 | Young et al. | Jan. 3, 1939 |
| 2,146,028 | Reynolds | Feb. 7, 1939 |
| 2,218,965 | Young et al. | Oct. 22, 1940 |
| 2,268,251 | Haux | Dec. 30, 1941 |
| 2,385,916 | Hahn | Oct. 2, 1945 |
| 2,659,935 | Hammon | Nov. 24, 1953 |
| 2,666,954 | Potter | Jan. 26, 1954 |
| 2,827,727 | Lipsius | Mar. 25, 1958 |
| 2,841,205 | Bird | July 1, 1958 |
| 2,860,378 | Urchick | Nov. 18, 1958 |
| 2,861,022 | Lundsager | Nov. 18, 1958 |
| 2,865,283 | Stoffer | Dec. 23, 1958 |
| 2,879,197 | Muskat et al. | Mar. 24, 1959 |

FOREIGN PATENTS

| | | |
|---|---|---|
| 558,242 | Canada | June 3, 1958 |

OTHER REFERENCES

"British Plastics," publication, January 1956, pages 5–9 and 39.